Patented Feb. 9, 1937

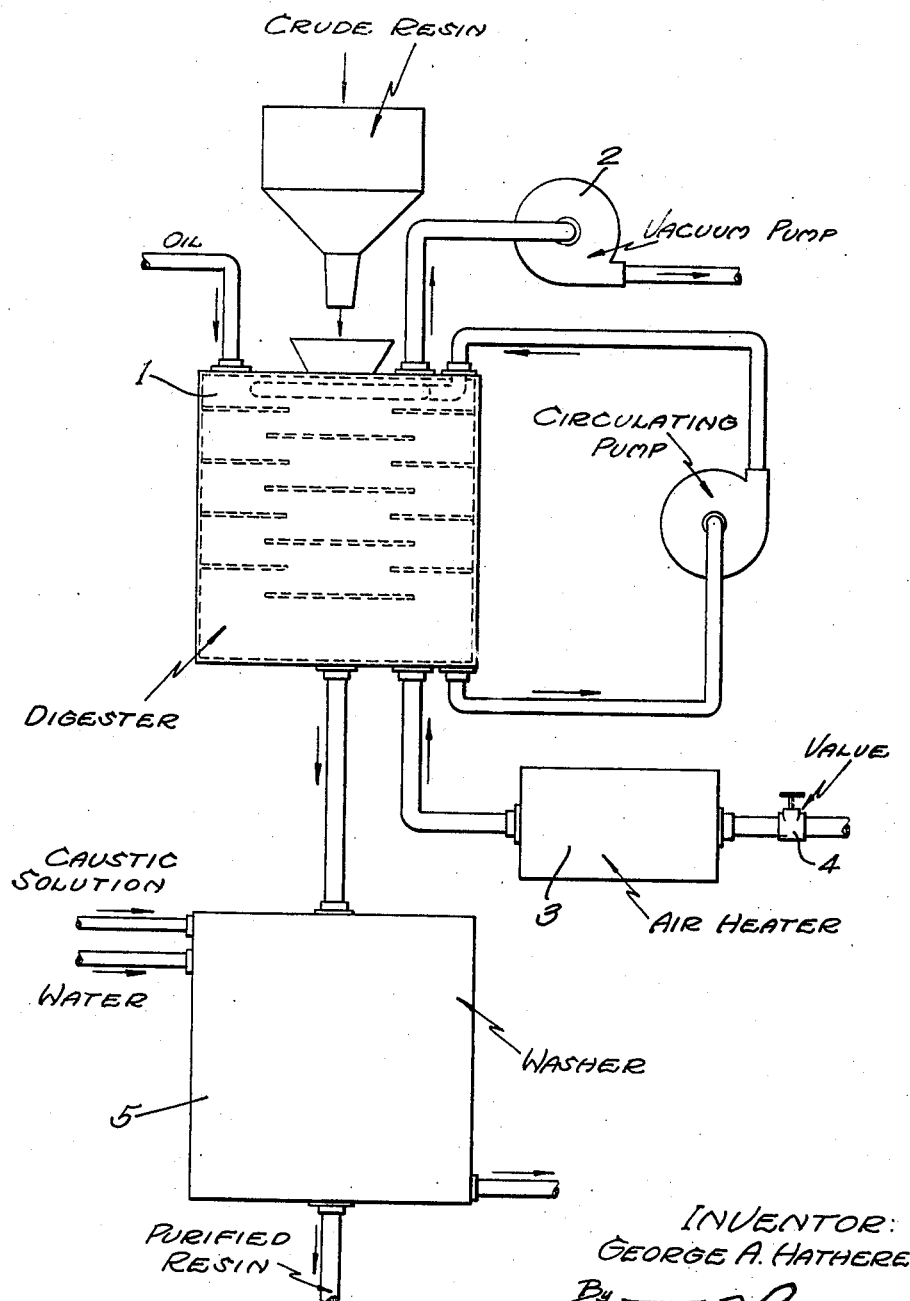

2,070,047

UNITED STATES PATENT OFFICE 2,070,047

METHOD OF PURIFYING RESINOUS MATERIAL SUITABLE FOR USE IN CHEWING GUM

George A. Hatherell, Burbank, Calif., assignor to Frank A. Garbutt, Los Angeles, Calif.

Application December 12, 1933, Serial No. 701,995

9 Claims. (Cl. 260—7)

My invention relates to the manufacture of chewing gum and particularly to the manufacture of chewing gum compounded from gums containing resins or resinous matter. Such gums are at present compounded either from natural gums, such as chicle and the cheaper chicle substances such as julatong, gutta hang kang, etc., or from what may be called synthetic chicles formed by compounding certain resins, rubber, proteins and other substances to form a base which when compounded with sugar, glucose or other flavoring matter forms the chicle type gum now in general use.

I have discovered that chewing gum bases may be compounded which very closely resemble the standard chicle bases without the use of chicle or any of its recognized substitutes and in my application Serial No. 497,770, filed November 24, 1930, which terminated in Patent No. 1,887,930, issued November 15, 1932, I disclose a complete process for producing such a base.

I have further discovered that bases compounded in accordance with the disclosure of said Patent No. 1,887,930 have the very desirable qualities of permanence and stability; that is, chewing gums produced from bases made in accordance with said patent do not deteriorate if kept for long periods. The ordinary chewing gums of commerce are very likely to deteriorate if kept for more than a few months even if wrapped in tightly sealed packages. This deterioration is evidenced by the development of a marked taste which it is impossible to accurately describe, but which makes the gum distasteful to the user. In some cases the deterioration is evidenced by a drying out of the gum, which renders it brittle, friable, or unduly sticky.

Since very small traces of various substances would impart this bad taste to the gum, and since chewing gum is a complex organic substance, it is difficult to exactly determine the nature of the substance or substances which cause the bad taste in ordinary chewing gum or render it brittle, friable, or sticky, if it is kept too long, to account for the variable nature of gum spoilage, or to determine the nature of the action which produces these objectionable substances.

Since the gum when first made does not have this particular bad taste, brittleness, friability, or stickiness to a noticeable degree and these objectionable characteristics develop in the gum as it ages, I assume that the bad taste is due to the decomposition or oxidation of certain constituents of the base, and without intending to limit myself to the decomposition theory, I have arbitrarily chosen to designate the substances, formed in some gums as they age, which impart a bad taste or odor to the gum as "decomposition products" or "impurities". The terms "decomposition products" and "impurities" as used hereinafter are limited to substances which are objectionable in themselves, or to substances which tend to form objectionable substances from the material of the gum.

It is an object of my invention to provide a method of treating a chewing gum base or one or more of the ingredients thereof, in such a manner as to prevent the later formation of decomposition products therein.

Chewing gums of the chicle type contain resins or resinous matter which is either a constituent of the natural gums such as chicle, or its various substitutes, or which is added to the base independently. I have found that it is possible to use various resins in compounding chewing gum and particularly cumarone resin, which is a synthetic resin produced by the polymerization of coal tar products. While such cumarone resin is an excellent substance for use in this connection it will be entirely obvious to one skilled in the art that my process is equally applicable to other resins and that it may be applied to the purification of other resinous substances capable of use in (or as) chewing gum bases such as the natural gums so extensively used therein.

While I am not sure that the decomposition products producing bad characteristics in old chewing gum are all due to the decomposition of the resins or the action of the resins, or their products, on the other ingredients of the base, I have found that by treating the bases and particularly the resins, or the natural gums containing resinous matter, in a certain manner, the formation of decomposition products is greatly retarded if not in fact entirely prevented.

My invention will be better understood if I give a specific example followed by a discussion of certain facts in relation thereto. As a specific example I will consider the application of my invention to the manufacture of a chewing gum base compounded of rubber, resin, and a protein, without of course intending to limit the scope of my claims to this specific example which is given for illustrative purposes only.

The rubber may be used in various forms, preferably as crepe rubber or rubber latex. The protein used is preferably a protein produced by extraction with alcohol from a cereal grain. The resin may be a cumarone resin, some other resin, or any substance otherwise suitable which contains resinous matter. In the specific example being considered, I treat the resin prior to compounding it with the other ingredients.

The drawing submitted herewith shows diagrammatically the method of operation, no attempt being made to specifically indicate on the drawing either the dimensions or the physical characteristics of the various units of equipment, the choice of suitable apparatus being well within the powers of one skilled in the art.

I first procure a resin (preferably a cumarone resin) having a melting point somewhat below 100° C., preferably between 50° C. and 100° C. Commercial resins of these characteristics made from benzol derivatives are available commercially but are not suitable for use in chewing gum due to their taste and odor. The resin is charged through a charging opening into the digester 1 shown diagrammatically in the drawing. The digester is provided with a hot oil jacket and is heated thereby to a temperature well above the melting point of the resin. The digester being a closed vessel capable of resisting atmospheric pressure, the vacuum pump 2 is started and the air is exhausted from the interior of the digester, preferably to absolute pressure of about 30 millimeters of mercury.

A stream of gas is then admitted to the bottom of the digester, being drawn into the digester through a valve 4. Air is suitable for this purpose. No more air is admitted than the vacuum pump will exhaust so that the vacuum is maintained inside the digester throughout the operation. The air is heated in the air heater 3 prior to passing through the resin to the temperature of the oil jacket. This air bubbles up through the hot resin in the bottom of the digester and then passes upwardly through the digester.

To insure an intimate contact between the resin and the air, the resin is pumped into the extreme top of the digester and distributed by a sprayer over dividing means which break the hot resin up into fine films or streams which flow downwardly through the digester in intimate contact with the ascending air which is being continuously removed by the vacuum pump.

The action of the hot air on the resin is probably threefold. First, it tends to facilitate the escape of constituents of the resin which are vaporizable at the temperature maintained in the digester, which constituents I believe to be those which impart a disagreeable taste or odor to the resin. Second, the hot air tends to oxidize undesirable constituents in the resin, producing gases which are removed by the vacuum pump. And third, it tends to oxidize certain constituents of the resin producing solids which are readily removable by subsequent treatment later to be described.

If it is desired to eliminate the oxidation, an inert gas such as carbon dioxide may be used. The gas then acts merely as a carrier for the vaporized impurities.

The vacuum facilitates the vaporization and escape from the resin of any vapors or gases in the resin.

The circulation of the hot resin under vacuum is continued until the exhaust from the vacuum pump is substantially pure air.

While some commercial resins after treatment as above described have the proper viscosity for my purpose, I find it necessary at times to reduce the viscosity of the resin by allowing a small amount of neutral mineral oil to flow into the resin. I have found that a petroleum oil commonly termed "600W" is an excellent substance for my purpose. From 5% to 10% of oil is usually sufficient to produce the proper viscosity of the resin. After adding the oil, the injection of air, maintenance of vacuum, and circulation of hot resin are continued for a period equal to about one-half the previous period of treatment. This additional treatment not only thoroughly mixes the oil with the resin, but also further purifies the mixture. During the time the hot resin is in contact with the hot air, the air acts as an oxidizing agent and produces oxidized products which remain in the resin and which are objectionable, due to their imparting a bad taste or odor to the resin. It is necessary that these oxidized substances be removed from the base. For this reason the hot resin is run into a washer 5 in which it is agitated in a hot 1% to 5% aqueous caustic soda solution for several hours and is then washed with several changes of hot water and finally neutralized by the addition of the small amount of acid necessary. The caustic acts upon the previously oxidized solids to so modify them that they are carried off in the wash water, leaving the resulting resin free from disagreeable odor or taste and can be freely used in chewing gum or other food products.

In the specific example just considered a certain amount of the decomposition products is present in the resin at the time it is purchased and if such resins are used in their commercial form, a bad taste may be immediately evident in the compounded gum. This bad taste will probably increase with age, even if the resin is initially comparatively free from decomposition products.

I have carried my investigations far enough to become convinced that the bad taste of old chewing gum can be prevented if the resin or ingredients containing resin are purified as described above. In fact, spoiled chewing gum base can be reclaimed and rendered useful if treated as described above. This treatment undoubtedly removes the decomposition products and may remove products which are not in themselves objectionable but may in time form or assist in forming objectionable substances.

The term "resin" or "resinous material" as used in this specification and in the claims is intended to cover any natural or synthetic resin which is not soluble in water or weak alkaline solutions which has a melting point below 100° C. and which is otherwise suitable after purification as described herein for use in chewing gum.

I claim as my invention:

1. The steps in the art of purifying a material containing resinous substances which contain or may form decomposition products and which are otherwise suitable for use as and are used in chewing gum bases, which comprise: heating said material to render it liquid; bringing the material while in its heated condition into contact with air so that certain impurities therein are oxidized; treating said oxidized material with an alkali; and washing the alkali treated material with water to remove impurities therefrom.

2. A method of removing decomposition products from material containing resinous substances which contain or may form decomposition products and which are otherwise suitable for use as and are used in chewing gum bases, which comprises: heating said material to render it liquid; bringing the material while in its heated condition into contact with air so that cerain impurities therein are oxidized; maintaining a partial vacuum on said material during said contacting; treating said oxidized material with an alkali; and washing the alkali treated material with water to remove impurities therefrom.

3. A method of purifying a resin or resinous substance for the purpose of adapting it for use as or in a chewing gum base, which comprises: contacting resin with air, the resin being maintained at a sufficient temperature to render it liquid, and the air being maintained at sub-atmospheric pressure to promote the vaporization of certain portions of the resin; treating the resulting material with a weak aqueous alkaline solution; and thereafter washing the material with water to remove the impurities and reaction products.

4. A method of purifying a resin or resinous substance for the purpose of adapting it for use as or in a chewing gum base, which comprises: contacting resin with a gas having no deleterious effect on said resin, the resin being maintained at a sufficient temperature to render it liquid, and the gas being maintained at sub-atmospheric pressure to promote the vaporization of certain portions of the resin; treating the resulting material with a weak aqueous alkaline solution; and thereafter washing the material with water to remove the impurities and reaction products.

5. A method of purifying a cumarone resin, which comprises: contacting cumarone resin with air, the resin being maintained at a sufficient temperature to render it liquid, and the air being maintained at sub-atmospheric pressure to promote the vaporization of certain portions of the resin; treating the resulting material with a weak aqueous solution of alkali; and thereafter washing the said material with water to remove the impurities and reaction products.

6. A method of purifying a cumarone resin, which comprises: contacting cumarone resin with a gas having no deleterious effect on said resin, the resin being maintained at a sufficient temperature to render it liquid, and the gas being maintained at sub-atmospheric pressure to promote the vaporization of certain portions of the resin; treating the resulting material with a weak aqueous solution of alkali; and thereafter washing the said material with water to remove the impurities and reaction products.

7. A method of purifying a cumarone resin, which comprises: heating the resin to a temperature sufficient to render it liquid; contacting the resin with air at sub-atmospheric pressure to promote the vaporization of certain portions of the resin; treating the resulting material with a weak aqueous solution of alkali; and thereafter washing the said material to remove the impurities and reaction products.

8. A method of removing decomposition products from a cumarone resin, which comprises: heating the resin to render it liquid; bringing the resin while in its heated condition into contact with air so that certain impurities therein are oxidized; maintaining a partal vacuum on said resin during said contacting; and thereafter treating said material with a weak aqueous solution of alkali.

9. A method of removing decomposition products from a cumarone resin, which comprises: heating the resin to render it liquid; bringing the resin while in its heated condition into contact with air so that certain impurities therein are oxidized; maintaining a partial vacuum on said resin during said contacting; treating said oxidized material with a weak aqueous solution of alkali; and washing the alkali treated material with water to remove impurities therefrom.

GEORGE A. HATHERELL.